United States Patent [19]

Barton et al.

[11] 4,156,910
[45] May 29, 1979

[54] NESTED DATA STRUCTURES IN A DATA DRIVEN DIGITAL DATA PROCESSOR

[75] Inventors: Robert S. Barton, Palo Alto, Calif.; Alan Davis, Salt Lake City, Utah; Erwin A. Hauck, Arcadia, Calif.; Don M. Lyle; Lloyd D. Turner, both of Huntington Beach, Calif.

[73] Assignee: Burroughs Corporation, Detroit, Mich.

[21] Appl. No.: 910,046

[22] Filed: May 26, 1978

Related U.S. Application Data

[63] Continuation of Ser. No. 447,034, Feb. 28, 1974, abandoned.

[51] Int. Cl.² .............................................. G06F 7/00
[52] U.S. Cl. .................................................. 364/200
[58] Field of Search ... 364/200 MS File, 900 MS File, 364/300

[56] References Cited

U.S. PATENT DOCUMENTS

| | | | |
|---|---|---|---|
| 3,293,616 | 12/1966 | Mullery | 364/200 |
| 3,349,375 | 10/1967 | Seeber et al. | 364/200 |
| 3,715,730 | 2/1973 | Smith et al. | 364/200 |
| 3,716,840 | 2/1973 | Masten et al. | 364/200 |
| 3,720,820 | 3/1973 | Cochran | 364/736 |
| 3,737,864 | 6/1973 | Werner | 364/200 |
| 3,794,984 | 2/1974 | Deerfield | 364/200 |
| 3,824,561 | 7/1974 | Wolf | 364/200 |
| 3,875,391 | 4/1975 | Shapiro | 364/200 |
| 3,889,243 | 6/1975 | Drimak | 364/200 |
| 3,916,387 | 10/1975 | Woodrum | 364/200 |

Primary Examiner—Mark E. Nusbaum
Attorney, Agent, or Firm—Nathan Cass; Kevin R. Peterson; Edward J. Feeney, Jr.

[57] ABSTRACT

A character-serial electronic digital computer utilizing a four character vocabulary, each character being represented by two binary bits, is structured to process character-serial data arriving at the computer in a manner specified and initiated by the arriving data. Data structures that may represent program or operations to be performed on data arriving at the computer input are stored in the computer's storage area in the form of nested data structures that may be illustrated as tree structures in which each node of the tree structure represents an operation. Data structures that may represent operands are also supplied to the computer in a nested organization. This operand data addresses a certain node or operation resident in the computer storage area. The linking up of the arriving operand data with its program data triggers execution of the operation. In a case where more than one operand is needed before an operation can be performed, the arrival of a first operand without the second causes storage of the first operand until arrival of the second. Arrival of the second operand triggers the operation to begin. This interrelationship of program data and operand data, that is, the dynamic data being linked with the static data to trigger the operation, exists whether the program data is stored and static or the operand data is stored and static. Utilizing a four character vocabulary to represent data, two of the characters being utilized to indicate the beginning and end of a data field, facilitates the implementation of an error checking technique wherein only sensed characters indicating the beginning and end of a data field are counted. The utilization of beginning and end of data field characters in the data structures consisting of nested data fields permits at will expansion and contraction of the fields within it.

8 Claims, 13 Drawing Figures

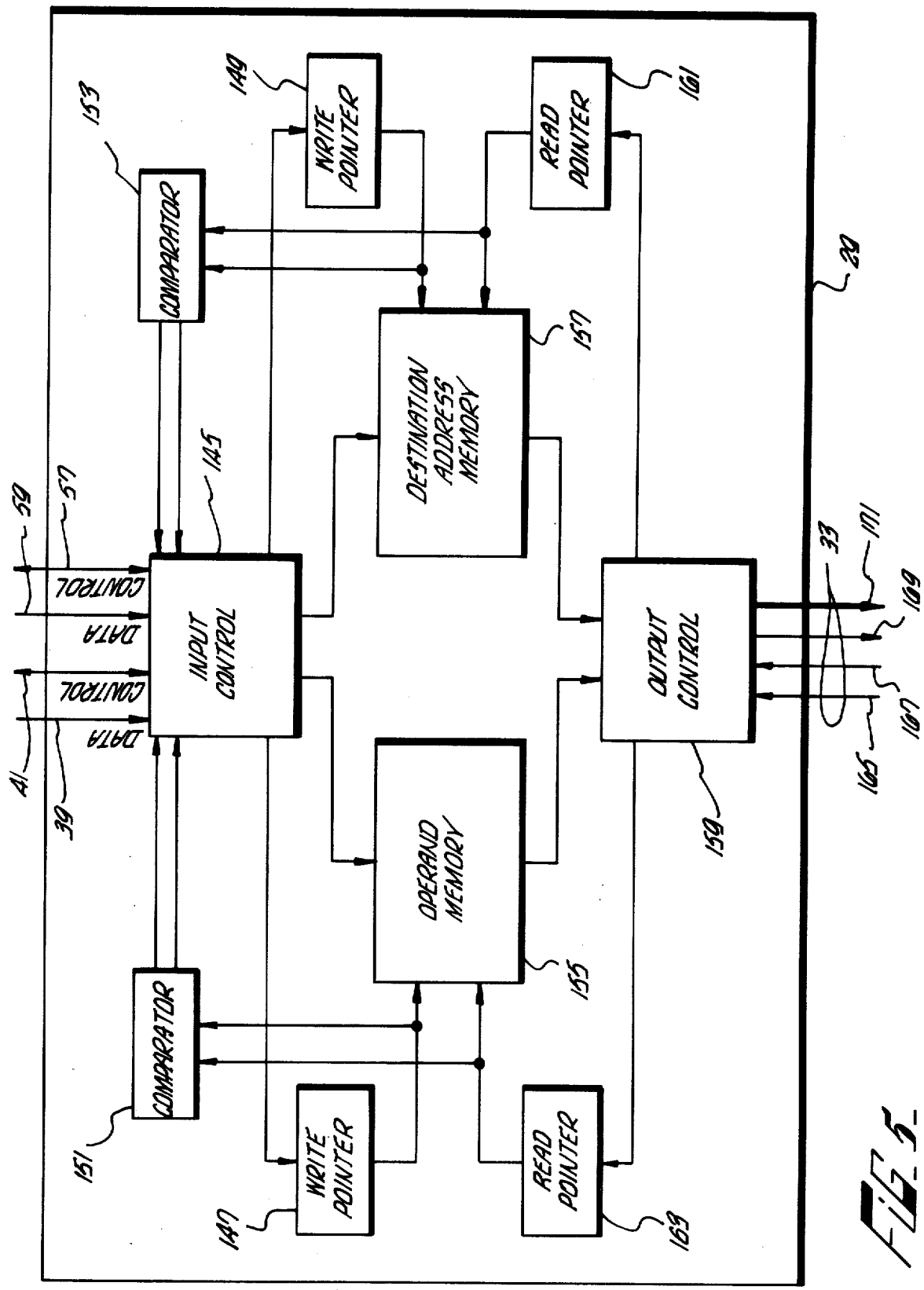

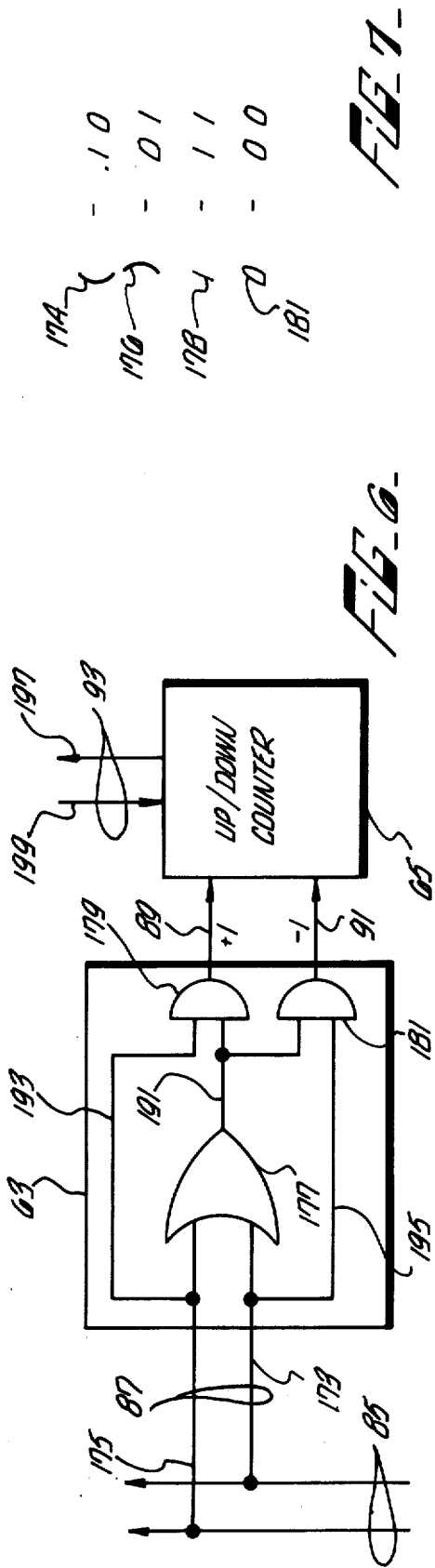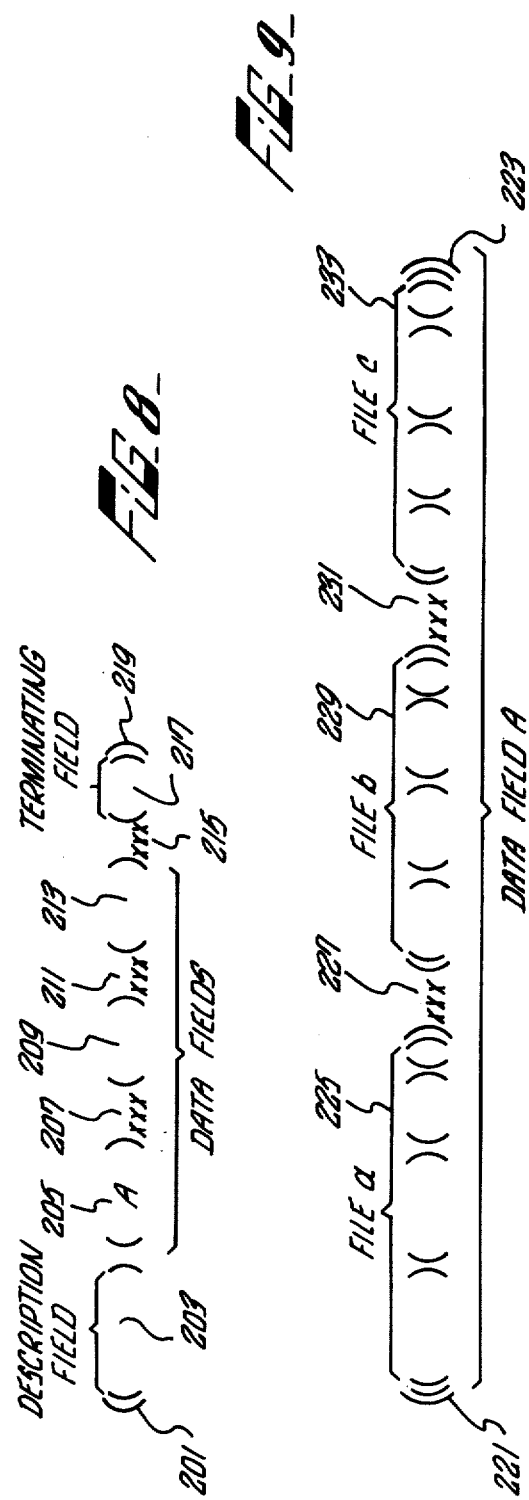

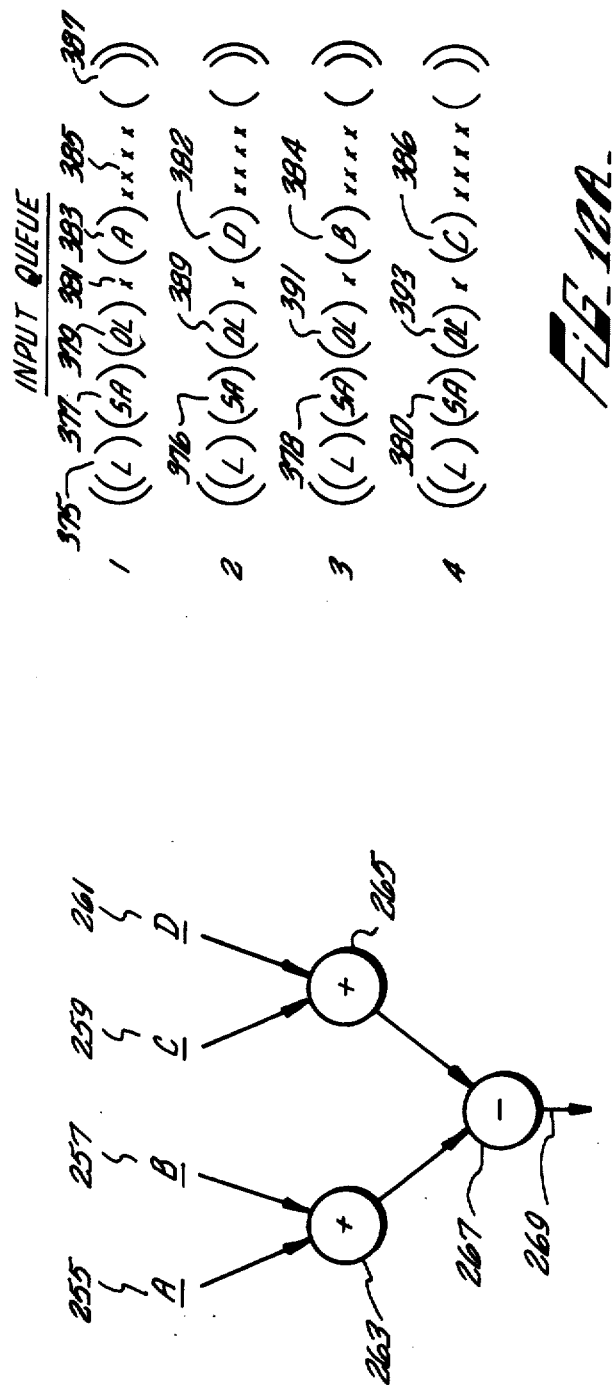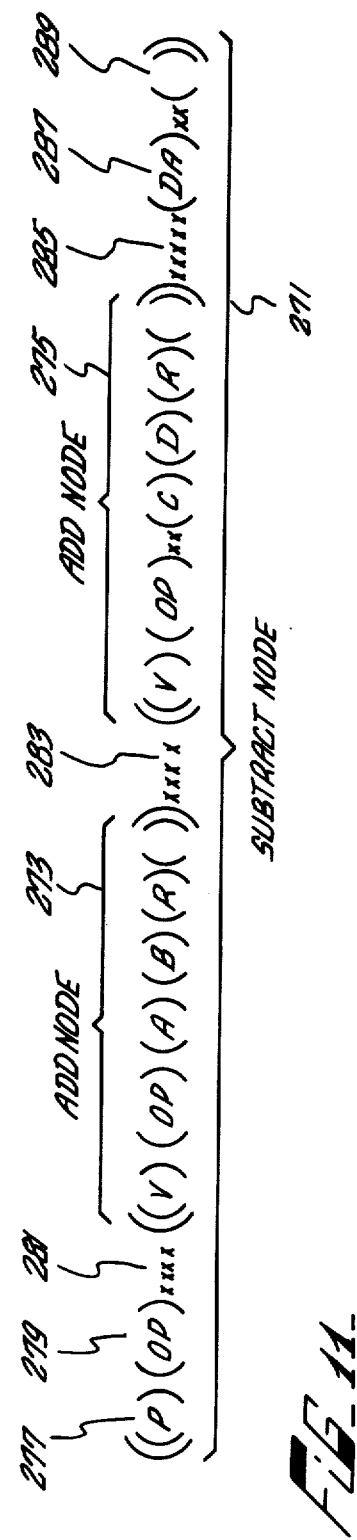

FIG. 12B

NESTED DATA STRUCTURES IN A DATA DRIVEN DIGITAL DATA PROCESSOR

This is a continuation of application Ser. No. 447,034, filed Feb. 28, 1974 now abandoned.

CROSS REFERENCE TO RELATED APPLICATIONS

This application is related to the following copending applications:
1. Ser. No. 447,016, filed Feb. 28, 1974, for a Data Driven Digital Data Processor.
2. Ser. No. 447,015, filed Feb. 28, 1974, now U.S. Pat. No. 3,886,533, for Vocabulary and Error Checking Scheme for a Character-Serial Digital Data Processor.
3. Ser. No. 446,911, filed Feb. 28, 1974, for Structured Data Files in a Data Driven Digital Data Processor.
4. Ser. No. 446,912, filed Feb. 28, 1974, for Recursive Mechanism in a Data Driven Digital Data Processor.
5. Ser. No. 447,040, filed Feb. 28, 1974, for System and Method of Concurrent and Pipeline Processing Employing a Data Driven Network.
6. Ser. No. 447,017, filed Feb. 28, 1974, for Data Processing System.

BACKGROUND OF THE INVENTION

The present invention relates generally to improvements in digital data processors, and more particularly pertains to new and improved digital data processor systems wherein the data processor is a microprogrammed integrated circuit device.

In the field of digital data processing it is presently the practice to employ system architectures that evolved under the influence of high hardware cost. This constraint resulted in centralization of system control into devices referred to as the central processor and main memory units. Because of this massive and expensive centralized hardware which needed to be controlled, operating systems (master control programs) were evolved to generalize its utilization, by sharing it across a number of programs or tasks. The system architectures which resulted from these influences are highly generalized and as a result, are unnecessarily complex, ad hoc, and inefficient with respect to a large number of particular situations. This type of architecture is partitioned in an irregular manner and is implemented principally by hardwired sequential logic. Where micro-programming techniques are utilized, the basic system functional architecture is not changed in that the microcoded processors still follow register oriented clocked sequential architectures.

The new integrated circuit technology, such as MSI and LSI which provide the essential elements of a data processor on a single chip can be utilized effectively only if a new set of design constraints is followed. LSI technology, for example, requires hardware regularity and non-dedication of specialized or complex algorithms to circuit chips. Additionally, since integrated circuit memories are interface compatible with integrated circuit logic, the register oriented processor architecture scheme may be eliminated by distributing the system circuit memory through the system. This, of course, eliminates the need of a centralized main memory subsystem. Now that it is feasible to distribute system memory throughout a system, it is desirable to eliminate the previously required central control operating systems.

To be able to utilize LSI technology effectively, a system architecture which results in a well-formed and regular partitionable system is required. Even though nearly all microprogramming techniques utilized in the past have this underlying objective, prior art programming techniques have failed to produce a system which is efficient to program and efficient in execution of its algorithms. In other words, these prior-art microprogrammed systems exhibit a total lack of continuity between what the machine language is and what the user programming needs and language demands are. This is true because the prior-art machine microcode languages are serial and binding in nature which is in direct opposition to the LSI technology demands for regularity, and nonbinding of complex functions.

SUMMARY OF THE INVENTION

It is an object of this invention to provide a digital processor that may be used as a basic building block in a multi-processor computer.

Another object of this invention is to provide a digital processor for use as a building block in multi-processor computers that would not need to utilize a master control program or require an extensive interrupt system.

A further object of this invention is to provide an electronic digital computer that has improved emulation capabilities.

These objects and the general purpose of this invention are accomplished by utilizing a multi-character vocabulary in a character-serial data processor wherein two of the characters are used to define the start and end of a particular data field. Each character is represented by a plurality of binary bits. A process is carried out in response to the linking up of a pair of data structures, one data structure containing the program, the other data structure containing the operands. These data structures are made up of a plurality of nested data fields that may be illustrated as a tree structure. The data structures permit expansion and contraction of the fields within it. Either the program data structure or the operand data structure may be resident in the data processor's storage area (static) while the other is supplied to the process from the outside (dynamic). Arrival of the dynamic data structures at the input of the data processor causes the mating data structures in storage to be addressed. If all operands for the addressed data structures are present, the operation designated by the program data structures is performed.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof, and wherein:

FIG. 5 is a logic diagram of the output queue of the processor of FIG. 1.

FIG. 6 is a logic circuit of a signal recognition circuit utilized in the input queue of FIG. 2.

FIG. 7 is an abstract illustration of a four-character vocabulary utilized by the processor of FIG. 1.

FIG. 8 is an abstract illustration of the general structure of a data file utilized by the processor of FIG. 1.

FIG. 9 is an abstract illustration of a general data structure file that has subfiles within it.

FIG. 11 is an abstract illustration of a simple algorithm represented in tree form and the data structure or file representing that algorithm that is utilized by the processor of FIG. 1 to perform the specified operations.

FIG. 12 A and B is an abstract illustration of a specific example of the interaction of program and operand data structures within the various major parts of the processor of FIG. 1 to produce a desired result.

DESCRIPTION OF THE PREFERRED EMBODIMENTS

Figure 1:
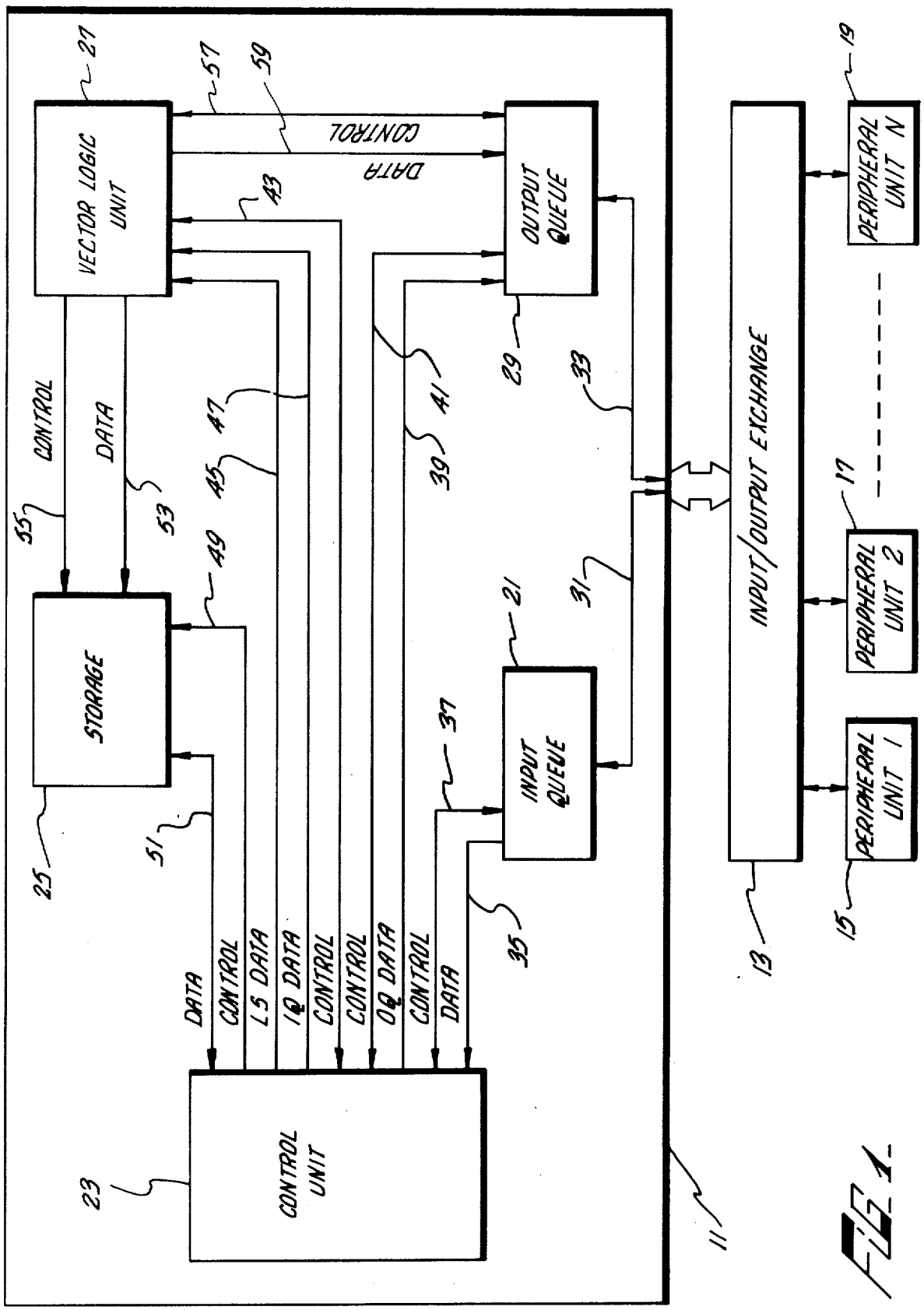
FIG. 1 is a block diagram illustration of a single processor data processing system, according to the invention.

FIG. 1, illustrates a one processor data driven processor system communicating with a plurality of peripheral units 15, 17, 19 through an input/output exchange 13. The input/output exchange 13 may be a standard type of switching circuit such as that used in telephone exchanges in which any one of the peripheral units may be connected to the data driven processor 11 by way of input cable 31 or output cable 33. The peripheral units may be parallel or serial format units. To accommodate the character serial nature of the processor 11 when parallel format units are utilized, the input/output exchange 13 would include a multiplexor to convert the plurality of parallel signal paths coming from the peripheral units 15, 17, 19 to the relatively serial signal path input to the processor 11. To accommodate the character-serial signal transmission from the processor 11 to the parallel format peripheral units 15 through 19, the input/output exchange 13 would include a demultiplexor. Peripheral units 15, 17, 19 may be any of the well known devices, such as, magnetic tape drives, card readers, card punch units, keyboard units, printers, or drum or disk storage devices.

The data driven digital computer or data processor 11 receives data structures from the peripheral units at its input queue 21. These data structures, as will be hereinafter explained, have a specialized organization and must follow certain syntax rules. The input queue 21 is basically a FIFO (first-in-first-out buffer unit) which performs the additional function of synchronizing the asynchronous data structures received on the input cable 31 to the system clock of the computer 11. The data structures received by the input queue 21, are received character serially. A commercially available FIFO buffer which may be adapted for use in the input queue 21 is disclosed in the Signetics Corporation 1972 parts catalogue, pages 7-135 to 7-138.

These data structures may be thought of as being communicated to the other elements of the processor 11 in a character-serial manner. Data structures in the input queue 21 are transmitted to computer storage 25, for example, in a character-serial manner over cable 35, to a control unit 23, and from the control unit 23 over cable 51 to computer storage 25. The control communication between the input queue 21 and control unit 23, over cable 37, and the control communication between the control 23 and the storage 25, over cable 49, will be hereinafter explained.

Besides data structures from the input queue 21 being transmitted to the storage 25, they may be transmitted to a vector logic unit 27 by way of control 23 over cable 47. Likewise, data structures from the storage 25 may be communicated to the vector logic unit 27 by way of control unit 23, over cable 45. Control communication between the vector logic unit 27 and the control unit 23, by way of cable 43, will be explained hereinafter.

Vector logic unit 27 is basically a serial arithmetic unit that performs, for example, such basic functions as addition, subtraction, compare and send-to on variable field length data structures. The vector logic unit may communicate directly with the storage 25, over data cable 53, and with an output queue 29, over data cable 59. The control communication between the vector logic unit 27 and the storage 25, over control cable 55, and with the output queue 29, over control cable 57, will be hereinafter explained.

The computer storage 25 of the data driven computer 11 may be a random access integrated circuit memory of a preferred size constructed from random access memory chips such as manufactured by the Signetics Corporation, for example. In their 1972 parts catalogue on page 4-24, Signetics Corporation lists a 32 by 2 random access memory chip that may be utilized in constructing the storage 25. The construction of a larger size memory with such a memory chip is considered as well within the purview of a person of ordinary skill in the art. Another example of a memory chip that may be utilized to build the storage 25 can be found in the 1972 Signetics catalogue on page 4-13 which illustrates a high speed content addressable memory chip.

The output queue 29 which may receive data structures from the vector logic unit 27, storage 25, or the input queue 21 performs the function of placing the data structures it has received into a form that may be transmitted to the peripheral units 15–19 by way of the I/O exchange 13. The output queue, like the input queue, is basically a FIFO buffer, accepting data structures in a character-serial manner and transmitting these characters to the I/O exchange.

Figure 2:
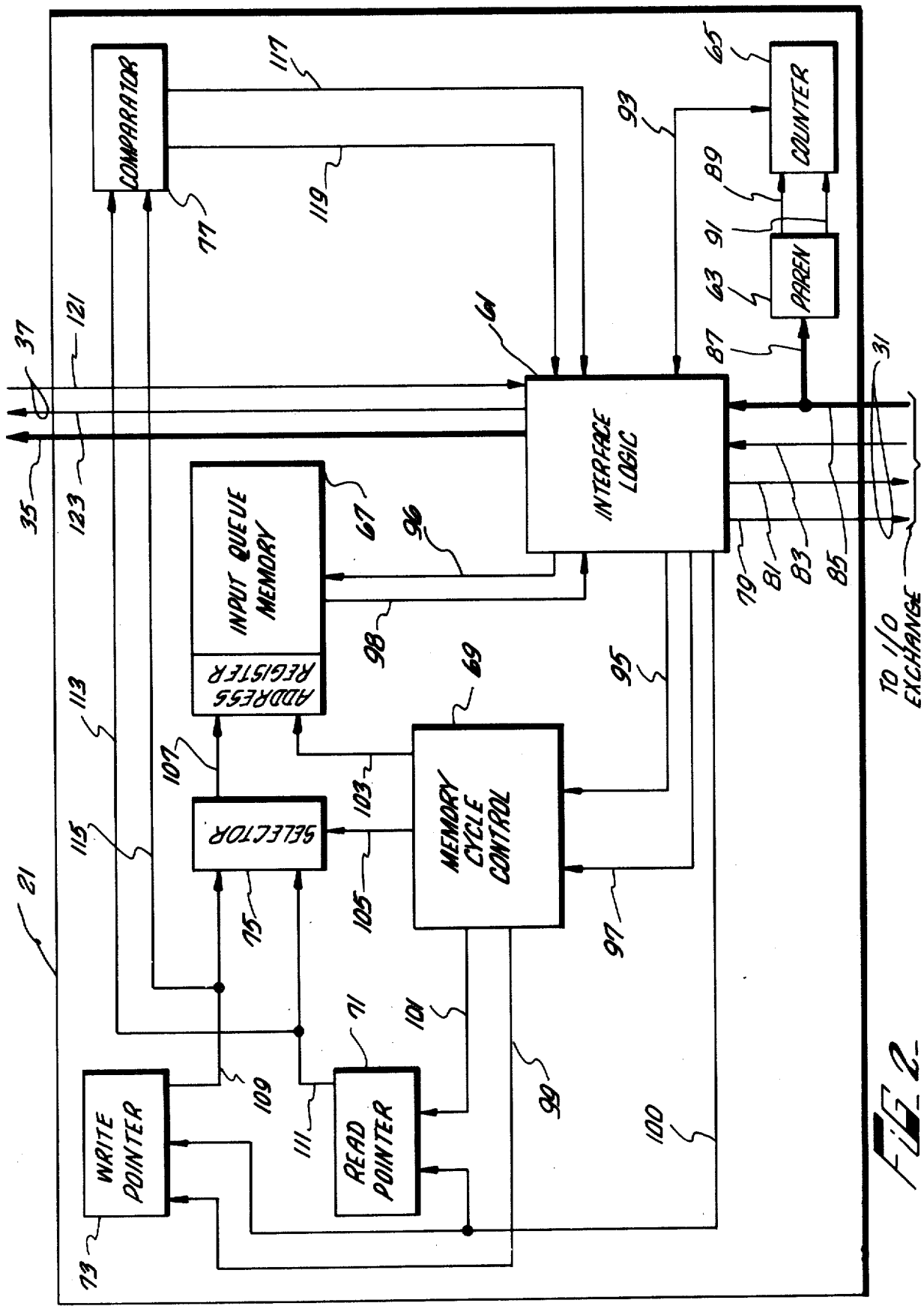
FIG. 2 is a logic diagram of the input queue in the processor of FIG. 1.

Referring now to FIG. 2, the input queue 21 communicates with the I/O exchange over cable 31. Cable 31 is made up of lines 79, 81, 83 and 85 which eminate from or lead to interface logic 61 in the input queue 21. Lines 85 are two parallel data lines that receive two bits in parallel from the I/O exchange (FIG. 1). These two parallel bits represent a character. The other three lines 79, 81 and 83 are control lines between the input queue and the I/O exchange. Line 79 transmits a binary signal level that instructs the I/O exchange to retransmit the data structure whenever an error has been detected in the previously received data structure. Line 81 carries a binary signal level that enables or disables the I/O exchange in regard to the transmission of data structures. Line 83 carries a signal level generated by the I/O exchange which indicates a request to send data structures from one of the peripheral units or the output queue of the data processor 11. It would be in response to such a request signal level that the signal level on line 81 would enable the I/O exchange, if the input queue could hold additional data.

The character serial data structure received on lines 85 from the I/O exchange 13 (FIG. 1), besides being submitted to the interface logic 61 is checked for errors by logic circuitry, for convenience called "paren" recognition logic, and a binary up/down counter 65 that responds to the "paren" recognition circuit 63. The count of counter 65 is transmitted to the interface logic 61 over cable 93. Suffice it to say for the present, if the count of the binary up/down counter 65 at the end of a particular data structure is not zero, interface logic 61 requests a retransmit over line 79 because an error occurred in the data structure. The specific logic of paren recognition circuit 63 and its interaction with up/down counter 65 and the interface logic 61 will be explained more fully hereinafter.

As was noted above, the input queue 21 basically functions like a FIFO buffer and synchronizes the asynchronous incoming data characters with the computer system clock (not shown) that is part of the interface logic 61. The buffer portion of the input queue is the input queue memory 67 which may be a random access memory built from integrated circuit random access memory chips manufactured by the Signetics Corporation and listed in their 1972 parts catalogue on page 4-20.

The data characters received on lines 85 from the peripheral units are transmitted to the input queue memory 67 over lines 96 where they are stored in the next available space as indicated by the write pointer circuit 73. In between the storing of data characters in the input queue memory, data characters are being read out of this memory and transmitted to the other components of the processor 11 (FIG. 1) by way of the control unit 23 (FIG. 1). The particular data character that is read out of the memory 67, at a certain instant in time, is determined by the read pointer circuit 71. The data character that is read out of the input queue memory is transmitted from the input queue memory over lines 98 to the interface logic 61 and then to the control unit 23 (FIG. 1) over lines 35. The control lines 123, 121 making up the control cable 37, carry read enable and read request signals from the control unit 23 (FIG. 1). Line 123 carries a read enable signal. Line 121 carries a read request signal. Generally speaking, then, information is being stored into the input queue memory 67 as fast as it is received and it is being read out from the input queue memory 67 in a FIFO order as fast as the control unit 23 (FIG. 1) is calling for it. As the interface logic 61 receives data characters over lines 85, it generates a signal on line 97 to a memory cycle control unit 69 indicating that a write function is required. Memory cycle control, in response to this write request generates a write enable signal, on line 103, to the input queue memory 67, a write select signal, on line 105, to a selector 75, and an increment signal, on line 99, to a write pointer 73.

Selector 75 may be of the type manufactured by the Signetics Corporation and described in their 1972 parts catalogue on page 2-136. Basically, the selector, in response to a write or read select signal on line 105 chooses the write or read pointer output signal supplied to it on cable 109 and 111 respectively, to transmit over cable 107 to the address register of the input queue memory 67.

The write pointer 73 and read pointer 71 may be a binary counter manufactured by the Signetics Corporation and listed in their 1972 parts catalogue on page 2-100. The incrementing inputs 99, and 101 to the write pointer and read pointer, respectively, from memory cycle control 69 would be connected to the A input (not shown) of these Signetics counters. Line 100 from interface logic 61 to both the read pointer 71 and write pointer 73 would be connected to the reset inputs (not shown) of these counters.

The outputs of both the write pointer and read pointer, besides going through the selector to address the input queue memory 67, are sampled by a comparator 77. The comparator may take the form of a comparator circuit manufactured by the Signetics Corporation and illustrated in their 1971 TTL/MSI parts catalogue on page 101. This comparator has two output leads which indicate which of the two inputs is larger, and when they are equal. Because the input queue 67 is functioning as a FIFO, that is, a first-in first out buffer, the write pointer count will always be greater than the read pointer count, whenever the input queue memory 67 had data therein but is not full. Therefore, a signal on line 119 from comparator 77 will indicate to interface logic 61 that the write pointer count is greater than the read pointer count. This indicates to the interface logic that data still remains in the input queue memory.

Whenever the write pointer count equals the read pointer count, a signal is transmitted from the comparator, over line 117, to the interface logic 61. This signal can mean that the input queue memory 67 is either completely empty or completely full, depending upon whether the last memory request generated by the interface logic 61 was a read or write request. The interface logic 61 interprets the signal on line 117 as meaning that the input queue memory 67 is full if the last memory operation was a write operation. If the last memory operation was a read operation, a signal on line 117 is taken as an indication that the input queue memory is empty. The synchronization logic 61 knows if the last memory operation was a write or read operation since it transmitted either a write or a read request over lines 97, 95, respectively, to the memory cycle control 69. Whenever the interface logic 61 determines that the input queue memory 67 is empty, it generates a reset signal on line 100 to be supplied to both the write and read pointers.

The specific logic circuitry of the memory cycle control 69 and interface logic 61 will not be discussed herein because the implementation of the functions herein attributed to these logic circuits is viewed as well within the purview of a person of ordinary skill in the art.

Figure 3:
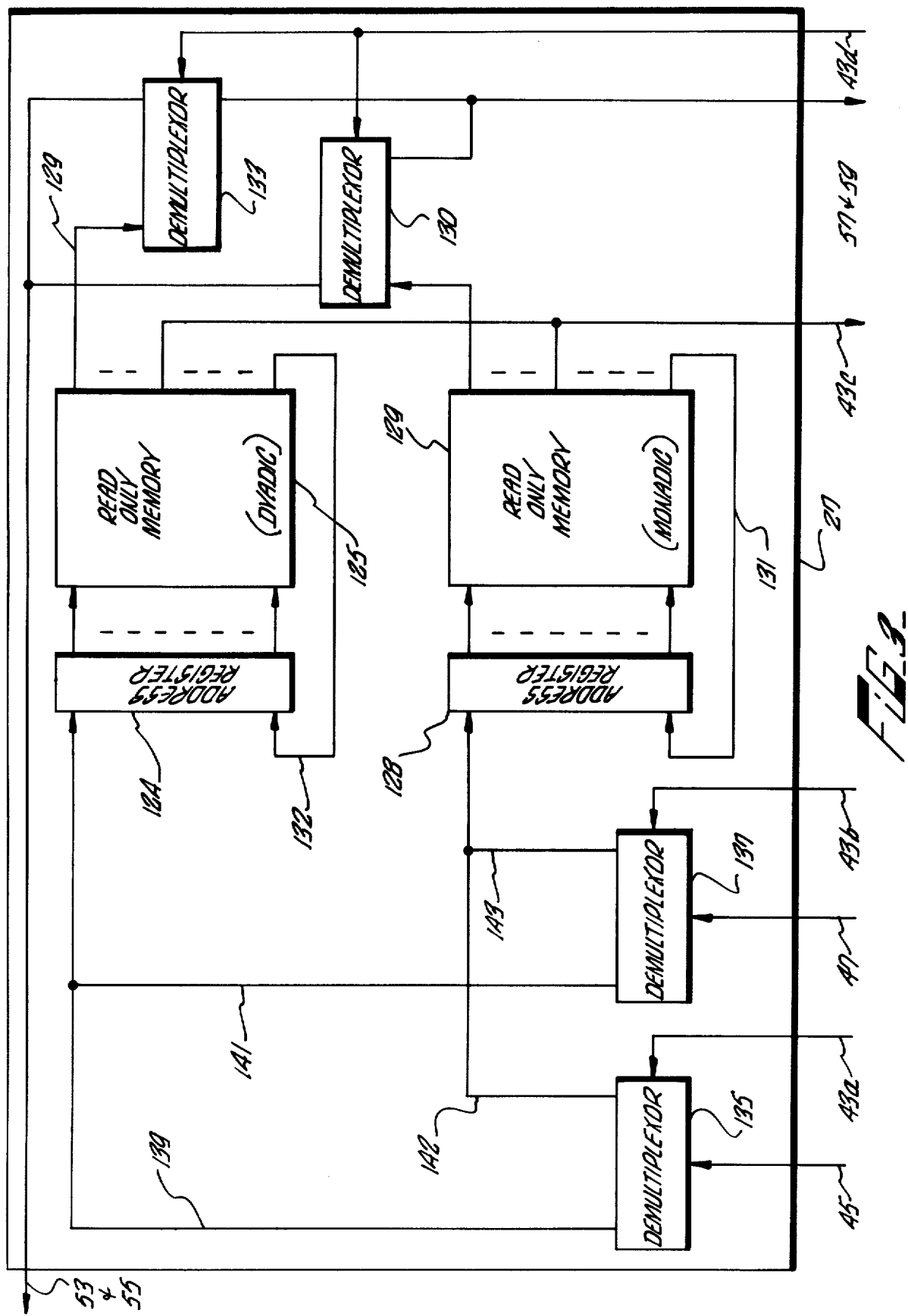
FIG. 3 is a logic diagram of the vector logic unit in the processor of FIG. 1.

Referring now to FIG. 3, a serial vector logic unit 27 that may be utilized in the computer of FIG. 1 is illustrated as consisting basically of two ROMs (read-only memories) 125 and 129. Both ROMs may be of the type manufactured by the Signetics Corporation and listed in their 1972 parts catalogue on page 4-1. Address registers 124 and 128 for the read only memory 125 and 129, respectively, are standard parallel in parallel out address registers. The only structural difference between the two read only memories resides in the micro-code contained within them. Read only memory 125 contains the micro code required for generating the results of dyadic operations such as, addition, subtraction, or compare, for example. Read only memory 129 contains the micro-code required to generate the result of monadic operations such as complement, delete first bit, or first bit to zero, for example.

Data structures coming character-serially from the storage 25 of the computer 11 (FIG. 1) by way of the control unit 23 over lines 45 to the vector logic unit 27 are directed by demultiplexor 135, according to a control signal on line 43a from the control unit 23, to the dyadic ROM 125 over line 139, or the monadic ROM 129 over line 142, depending upon what kind of data structure is being addressed by the data structure in the input queue 29. This will be more fully explained hereinafter.

Likewise, the demultiplexor 137 receives character-serial data over lines 47 from the input queue 21, by way of control unit 23, and routes it either to the dyadic ROM 125 over line 141 or the monadic ROM 129 over line 143. The output of either the dyadic ROM 125 or the monadic ROM 129 will be routed to the storage 25 of the computer or to the output queue 29 of the computer (FIG. 1), depending on the destination address contained within the program data structure. This destination address is supplied to demultiplexors 133 and 130 over lines 43d by the control unit 23 of computer 11 (FIG. 1).

The demultiplexors 135, 137, 130, and 133 utilized in this vector logic unit may be of the type manufactured by the Signetics Corporation and illustrated in their 1972 parts catalogue on page 2-132.

Assuming, for purposes of example, that a dyadic operation were to be performed, an operand A being summed with an operand B, an OP code designating the dyadic operation of addition would be supplied to the address register 124, either from the storage 25 or the input queue 21 of the computer, for reasons which will be hereinafter made clear. Along with this OP code, the two operands are also supplied, character serially, to the address register 124. As a result, the output on cable 129 of the read only memory 125 would be the character serial results of the summation of the two operands. Effectively, what is occurring is the OP code, in addition to the operands, act as addresses to the particular areas in the read only memory 125 that are storing the results of the summation of a particular two characters from the two operands being summed.

The output of the read only memory 125, in this particular example, would also contain a signal on line 43c that would indicate to the control unit 23 (FIG. 1) that a particular character summation has been completed. Also, in the case of addition, carry signals are propagated back to the input of the read only memory 125 on lines 132 to modify the next character addition. In case of monadic operations being performed with read-only memory 129, feedback lines 131 may simply be a stepping counter input to modify the contents of the address register 128 of the monadic ROM so that the next memory location is addressed.

In summary, the control unit 23 introduces data structures from the storage 25 and the input queue 21 to the vector logic unit 27 which responds to these two data structures by generating a result plus control signals, which are sent back to the storage 25 over lines 53 and 55, or to the output queue 29 over lines 57 and 59.

Figure 4:
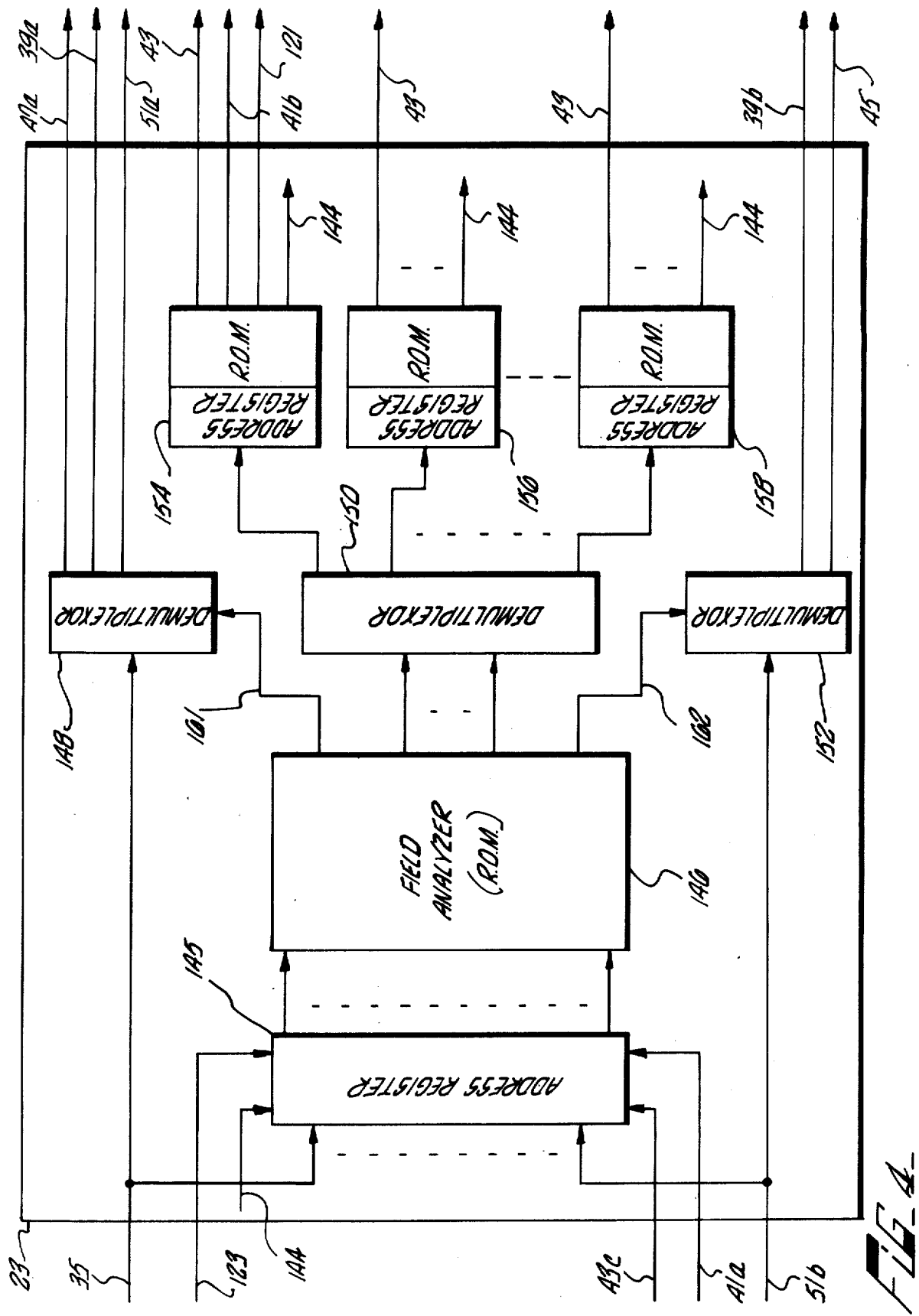
FIG. 4 is a logic diagram of the control unit of the processor of FIG. 1.

Refer now to FIG. 4 which illustrates the control unit 23 of computer 11 to be a microprogrammed unit consisting of a plurality of read-only memories and multiplexors. The field analyzer ROM 146 receives data structures from the input queue, over lines 35, or from storage, over lines 51b. Either the data structure from the input queue 21 (FIG. 1) or the data structure from storage 25 (FIG. 1) addresses the field analyzer ROM 146 through address register 145 causing the field analyzer ROM 146 to respond by sending control signals to one of the plurality of demultiplexors 148, 150 and 152.

For example, if the data structure coming in on line 35 from the input queue (FIG. 1) happens to be an operand file, the field analyzer would direct the demultiplexor 148 to transmit the operand fields over one of the three lines 47a, 39a or 51a, line 47a leading to the vector logic unit, line 39a leading to the output queue, and line 51a leading to the store. The field analyzer would, in this instance, be responding to the description field in the operand file. Likewise, if a data structure coming in on line 51b from storage (FIG. 1) happens to be an operand file or field, the field analyzer ROM 146 would direct the demultiplexor 152 over line 162 to transfer the data over line 39b or line 45, line 39b leading to the output queue and line 45 leading to the vector logic unit.

Assuming now that instead of an operand data structure being received on either lines 35 or 51b, a program data structure is received. This program data structure would address the field analyzer ROM 146 causing it to transmit an address to one of the ROMs 154, 156, 158, by way of demultiplexor 150. The ROMs 154, 156, 158 make up a microprogram library that contains particular microprograms. These microprograms are addressed by the data structure coming in on either data lines 35 or 51b. Assuming that the data structure received by the field analyzer ROM 146 starts out with a field that indicates that what is to follow is a program file, the field analyzer would generate a plurality of signals to the demultiplexor 150 that would route the signals to the program file ROM 154, for example. In response to these signals addressing particular areas in this ROM, control signals are generated, over lines 43, to the vector logic unit (FIG. 3), over line 41b, to the output queue (FIG. 5), over line 121, to the interface logic of the input queue (FIG. 2), and when appropriate, over line 144 to the address register 145 indicating that the particular operation is completed.

In addition to receiving data structures over lines 35 and 51b, the address register 145 receives various control signals. For example, over line 123 a read enable control signal is supplied from the interface logic of the input queue (FIG. 2). Over line 43c, an operation complete signal is supplied from the vector logic unit (FIG. 3). Over line 41a, the output queue (FIG. 5) supplies a hold signal instructing the control that it is full. A continue signal is also supplied to the address register 145 from the ROM library over line 144.

The address register 145 is a standard parallel-in parallel-out register well known to those of ordinary skill in the art. The field analyzer ROM 146 may be of the type manufactured by the Signetics Corporation and listed in their 1972 catalogue on page 4-1. The microprogram library ROMs 154, 156 and 158 may be the same type. Demultiplexors 148 and 152 may be of the type manufactured by the Signetics Corporation and listed in their 1972 parts catalogue on pages 2-132. Demultiplexor 150 may consist of a plurality of demultiplexors in cascade, the individual demultiplexors being of a type manufactured by the Signetics Corporation and listed in their 1972 parts catalogue on pages 2-130.

Referring now to FIG. 5, the output queue 29 is illustrated as a dual-memory FIFO circuit. Input control circuit 145 receives data from either the input queue or storage over lines 39 by way of control unit 23 (FIG. 1). Lines 41 carry control signals from control unit 23 (FIG. 1). The input control circuit 145 also receives data from the vector logic unit 27 over lines 59 and, likewise, transmits and receives control from the vector logic unit 27 over lines 57. The data received by the input control 145 over lines 39 is routed either to the RAM (random access memory) operand memory 155 or the RAM destination address memory 157, depending upon whether the data structure received is a destination address, as determined by the signals on control line 41 from the control unit 23 (FIG. 1), or is an operand, as determined by the signals on control line 41. The data received on lines 59 by the input control 145 is routed to the operand memory or to the destination address memory, as determined by the signals on control lines 57.

Both the operand memory and destination address memory may be made up of RAM memory chips manufactured by the Signetics Corporation and listed in their 1972 parts catalogue on pages 4-20. Both memories are addressed by a write pointer or a read pointer, operand memory 155 having a write pointer 147 and a read pointer 163; destination address memory 157 having a write pointer 149 and a read pointer 161. The operation of these respective write and read pointers is identical to the operation they perform in the input queue when addressing the input queue memory 67 (FIG. 2).

The input control circuit 145 functions like the interface logic 61 in the input queue (FIG. 2) in responding to signals from comparators 151 and 153 to stop the transmission of information to the output queue 29 from the input queue, storage, or the vector logic unit. The comparators 151 and 153, respectively, indicate to the input control circuit 145, in the same manner that the comparator 77 of the input queue (FIG. 2) indicates, that the respective memories are either full, empty or contain some data.

The output control circit 159 of output queue 29 initiates a read request from either the operand memory or destination address memory RAMs 155, 157, respectively, in response to receiving a transmit instruction from the I/O exchange 13 (FIG. 1) over line 167 of cable 33. Output control 159 also responds to a retransmit signal over line 165. In response to signals on either one of these lines, the output control circuit 159 may transmit a request to write data signal on line 169 to the I/O exchange. Upon receiving a transmit signal over line 167, for example, the data structure, part of which is in both memories, is character-serially transmitted over lines 171 to the input/output exchange 13 (FIG. 1). It will be remembered that the input/output exchange 13 of FIG. 1, in response to receiving data structures over lines 171 from the output queue 29, will route such data structures according to the address field received from the destination address memory RAM 157. Thus, peripheral unit 1, 2 or N (FIG. 1) may receive the data or the data structure may be routed directly into the input queue of the computer 11, for further processing.

Referring now to FIG. 6, specific logic for the paren recognition circuit 63 (FIG. 2) is illustrated. The paren recognition circuit 63 has a pair of input conductors 175, 173, one each connected to the pair of input conductors in line 85. The signals on each one of these conductors 173 and 175 are supplied to the input of Exclusive OR gate 177 and, in addition, to an AND gate 179 over line 193 and an AND gate 181 over line 195. The output of the Exclusive OR gate 177 on line 191 is supplied as the other input to the respective AND gates. The output 89 of AND gate 179 generates a plus one up-count signal, whereas the AND gate 171 on output line 91 generates a minus one down-count signal to the up/down binary counter 65. The up/down binary counter 65 may be of the type manufactured by the Signetics Corporation and illustrated in their 1972 parts catalogue on page 2-170. The up-down counter 65 supplies a binary count over lines 197 to interface logic 61 of the input queue (FIG. 2) and receives a clock signal from the interface logic circuit 61 over line 199 of cable 93.

FIG. 7 illustrates the preferred two bit representations of the four characters utilized throughout the computer 11 (FIG. 1). The left data delimiter, for convenience called a left paren, 174 is represented by a high signal on a first line and a low signal on a second line, both signals being received substantially at the same time. A right data delimiter or right paren, 176, is represented by a high signal on the first line and a low signal on the second line, in direct opposition to the representation of the left data delimiter. A binary 1 character 178 is represented by two high signals. A binary 0 character 171 is represented by two low signals.

Referring again to FIG. 6, its operation in recognizing whether the signals being transmitted along line 85 represents a right or left data delimiter character, or a binary 1 or binary 0 character will now be explained. Assuming for purposes of example that the binary signal on conductor 175 is a 1, or high, and the binary signal on line 173 is a 0, or low, the output of Exclusive OR gate 177 will be a binary 1, and the signal on line 193 will be a binary one, causing AND gate 179 to generate a high signal level on line 89. This signl level causes up/down counter 65 to count up by 1. Assuming now that the binary signal on line 175 is a 0 and the binary signal on line 173 is a 1, representing a right paren character, the output of Exclusive OR gate 177 will be a binary 1, causing the output of AND gate 181 on line 91 to be high. The high signal level on line 91 causes up/-down binary counter 65 to count down by 1. The count of up/down binary counter 65 is supplied to interface logic 61 of the input queue (FIG. 2). Whenever both input lines 173 and 175 to paren recognition unit 63 are high, no output is generated on either lines 89 or 91 because the Exclusive OR gate 177 does not generate an enabling signal on line 191. The same situation exists when both lines 173 and 175 are binary 0.

Referring now to FIG. 8, the field arrangement or general format of a data file which is the basic unit of a data structure is as illustrated. The first field of a file is a description field. The next following fields are data fields. The last field is a terminating field. The outermost left and right parens, 201 and 219, respectively, define a file. Assuming that this file which may be considered a simple data structure is being transmitted from left to right, the opening paren is 201 and the closing paren is 219. The first field that follows the opening paren 201 is a description field 203, which is itself delimited by a pair of parens. The next field to follow the description field may be an operand field such as illustrated by field 205, or an address field, or an operator field.

The data in the description field 203 will describe the type and order of appearance of the various fields that follow it. The spaces 207, 211 and 215 between the data fields 205, 209 and 213, may, for convenience, be called "empty space" which permits the data fields 205, 209 and 213 to expand, if necessary. When these fields contract, they create more empty space. All this empty space may be used to later allow these fields to expand.

The exact vehicle by which this occurs will be more fully described hereinafter.

The last field of every file is a terminating field 217 which usually will have no data within it. In other words, it is simply two characters, a left paren and a right paren. The terminating field 217 and the file closing paren 219 are three characters that represent the ending code for the data structure or file. This code then, according to the convention of FIG. 7, is

```
100
011,
``` transmitted character-serially or two bits parallel, from left to right.

This terminating field and the ending file paren is interpreted as a file ending code by the interface logic 61 of the input queue (FIG. 2). When this code occurs, the output of the counter 65 (FIG. 2) will be 0 if no errors had occurred in the data fields of the file. For example, the output count of counter 65 for the general file structure of FIG. 8 would proceed in this manner, 121212121210. Thus, a combination of a 0 count from counter 65 and the occurrence of the terminating code indicates that the data structure received had no errors therein. If, for example, there was an error in a paren character, the counter would not be incremented or decremented. If there was an error in a data character, the paren counter would be incremented or decremented incorrectly. In either instance, a count other than zero is left at the time that the terminating code occurs. This would indicate an error, causing the interface logic of FIG. 2 to respond by requesting a retransmit, as above described.

The structure of each file is generally illustrated in FIG. 8 must follow certain syntax rules. These rules are:
(1) No 1 or 0 characters can occur between like facing parens. For example, there can be no characters between the opening file paren 201 and the opening field paren of the description field 203.
(2) The first field of a file must be the description field 203.
(3) The last field of the file is always the terminating field 207. In our example, this field has no data therein.

A data field such as the A data field 205 of FIG. 8 may itself be made up of a plurality of fields or even a plurality of files. For example, FIG. 9 represents field A as consisting of three subfiles a, b and c. The opening field paren 221 and the closing field paren 223 define data field A. But, within these parens, a plurality of what shall be called "vector files" may occur. Files a, b and c, 225, 229 and 233, respectively, illustrate vector files. These files, of course, must follow the general syntax rules described for the general file of FIG. 8. That is, each file has within it a description field, data fields and a terminating field. As may occur within a file, the spaces between vector files within a field, such as 227 and 231, can permit for expansion of the vector files within that field, if desired.

This nested structure of fields within files and vector files within fields may be more readily comprehended if thought of in terms of a tree structure having nodes that represent programs of operators. For purposes of example, let us assume that the following defined operation must be performed on a plurality of literals represented by the capital letters of the alphabet:

$$\{[(A+B)-(C+D)]+[(F+G)-J]\}-\{([(K-L)+(-M-N)]+[O-Q])-R\} \rightarrow X$$

Figure 10:
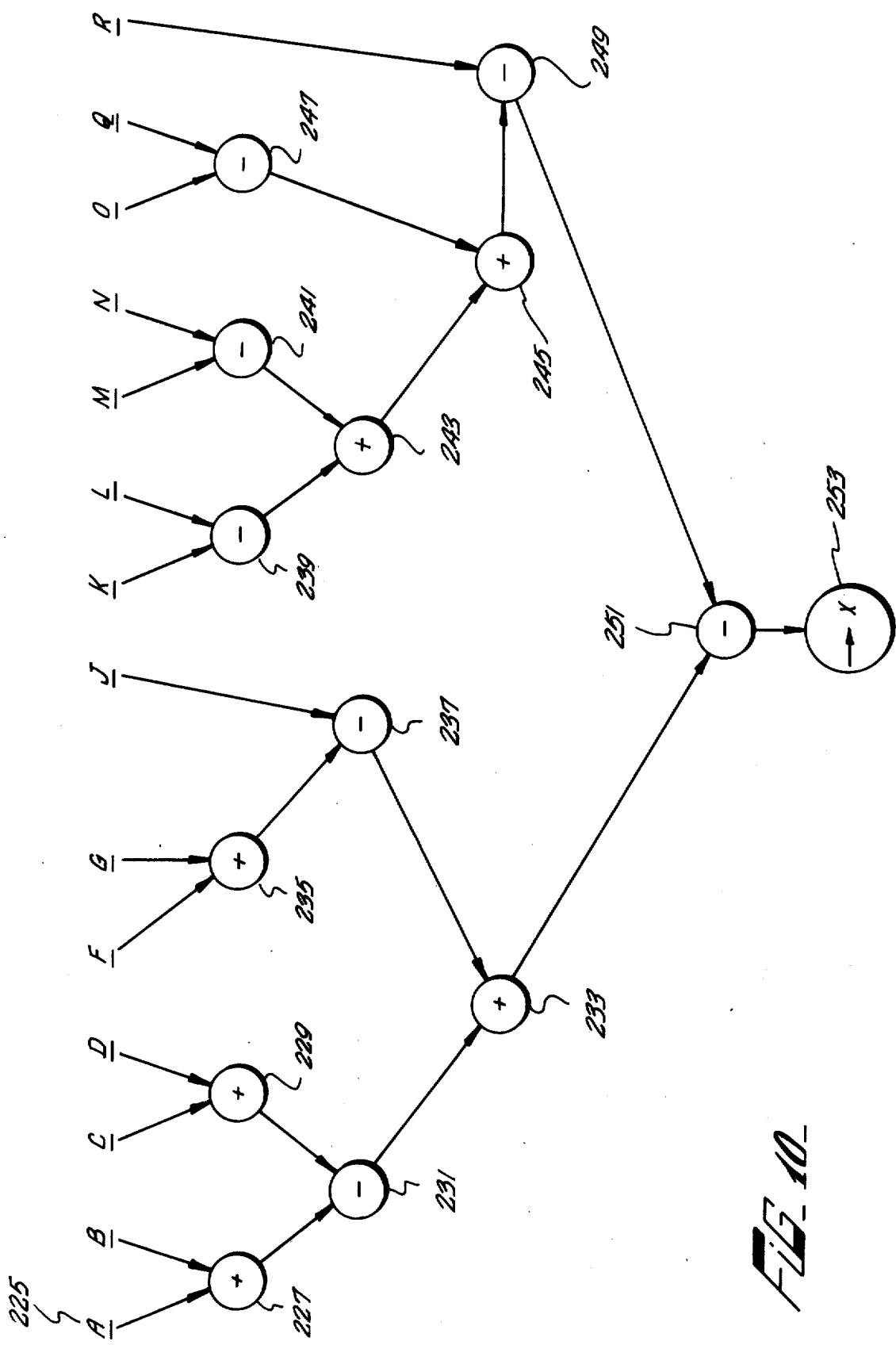
FIG. 10 is an abstract illustration representing in tree form a particular example of a program that may be executed by the computer of FIG. 1.

This arithmetic combination of 14 different literals may be represented by the tree structure shown in FIG. 10.

The tree structure of FIG. 10 receives as its inputs, at the leaf level 225, the literals, or other operands, that are to be operated upon by the program described by the various nodes 227, etc., of the tree. Thus, for example, the literals A and B are supplied to the add program operator at node 227; the literals C and D are supplied to the add program operator at node 229. The results of both operations are supplied to a subtract program operator at node 231. While this is occurring, the literals F and G may be supplied to another add program operator at node 235, the result of that summation being supplied to a subtract program operator at node 237, along with another literal J. Perhaps at the same time that these previous operations are occurring, the literals K and L are being supplied to a subtract program operator at node 239, the literals N and M are being supplied to another subtract program operator at node 241, and the literals O and Q are being supplied to yet another subtract program operator at node 247. The result of the operation at node 239 and the result of the operation at node 241 are supplied to an add operator at node 243.

The result of the subtract operator node 231 and the result of the subtract operator node 237 are supplied to another add operator node 233. The result of the add operator node 243 and the subtract operator node 247 are supplied to another add operator node 245. The result of the add operator 245 is supplied to the subtract operator node 249 which is also supplied another literal R. The results of the minus operator 249 and the add operator node 233 are supplied to another subtract operator node 251. The result of this node is supplied to the send-to-X operation 253.

As is apparent from this description of the tree structure, the processing of operands in a tree structured flow facilitates the processing of operands in a concurrent manner. That is, the operations occurring on the same level such as nodes 227, 229, 235, 239, 241 and 247, may all occur substantially simultaneously if the appropriate operands are available. The same is true for all operations on another, or second, level, such as nodes 231, 237 and 243, if the result of previous operations are all available simultaneously.

The example of FIG. 10, for the purposes of simplicity of description and ease of understanding only considered dyadic operations such as add and subtract. However, it should be understood that this type of tree structured process flow will accommodate monadic and dyadic operations with equal facility. It should be understood that to take advantage of concurrent processing a system of data processes must be utilized.

To illustrate how the nested file data structures of FIG. 8 and 9 implement the tree structured processing concepts, the following simple dyadic operations on four literals will be considered: $(A+B)-(C+D)$. These operations are illustrated in tree structured form in FIG. 11. The literals A, B, C, and D at the leaf level 255, 257, 259, 261 are supplied to the first level of operator nodes, the summing nodes 263 and 265. The results from this node level are supplied to the next level or subtracting node 267. The result of this node 269 may be sent to another node or, program operator, or a physical destination.

Each node of the tree structure, FIG. 11, can be considered to be a file. Therefore, looking at these two levels of node operators, the file that would describe the subtraction node 267 is illustrated as subtract node file 271. This file is delimited by right and left parens, and has a first field that is a description field 277 that describes the nature and sequence of the file. In this instance, P represents program, meaning that this file is a program operator file. Since this file is an operator file the next field to follow the description field will be a field 279 containing the operator code, OP. In our example, the operator code describes a subtract operation. Since the operation is dyadic, the fields that follow the operator field describe the two operands to be subtracted. These two operands are the results of add nodes 263 and 265.

Because the operands are results of other operations, the operand fields are vector files. Therefore, the operands are described by the vector files 273 and 275. The field that follows the operand fields is a destination address field 287 that indicates the destination to which the result of the subtract operation must be sent. The last field of the subtract file is the terminating field 289. Empty space may occur at any place between fields within a file. For example, within the subtract program file, empty space is illustrated as occurring at 281, 283, and 285. It should be remembered that since the operand fields of the subtract program file are vector files, empty space may also occur between the fields within these files.

Consider now the two vector files within the subtract program file, the add vector file 273 and the add vector file 275. These files are again structured according to the syntax rules described above. There are left and right file delimiting parens. Within these parents the first field is a description field which in this instance describes the file as a vector file, thereby reserving the next following field for the operator code. For our example, an add operation is described. The fields that follow the OP field will be the operand field which, in our example, are literals. In addition to operand fields, the dyadic vector files such as files 273 and 275 within a larger file, such as program file 271, contain resultant fields, denoted by R in FIG. 11. These resultant (R) fields store the result of the dyadic operation described by that vector file if that result cannot be used at the time that it is generated.

In order to facilitate understanding, the general operation of the computer 11 of FIG. 1 will be described in relation to the simple program flow illustrated in FIG. 11, which only utilizes dyadic operators. To further facilitate explanation and understanding, it will be assumed that the program data structures or program files are dynamic and received by the input queue 21 (FIG. 1). It should be understood, however, that the reverse is equally applicable and that the operand files may be stored in computer storage 25 and the program files may be supplied to the computer 11 by way of input queue 21.

Figure 12B:
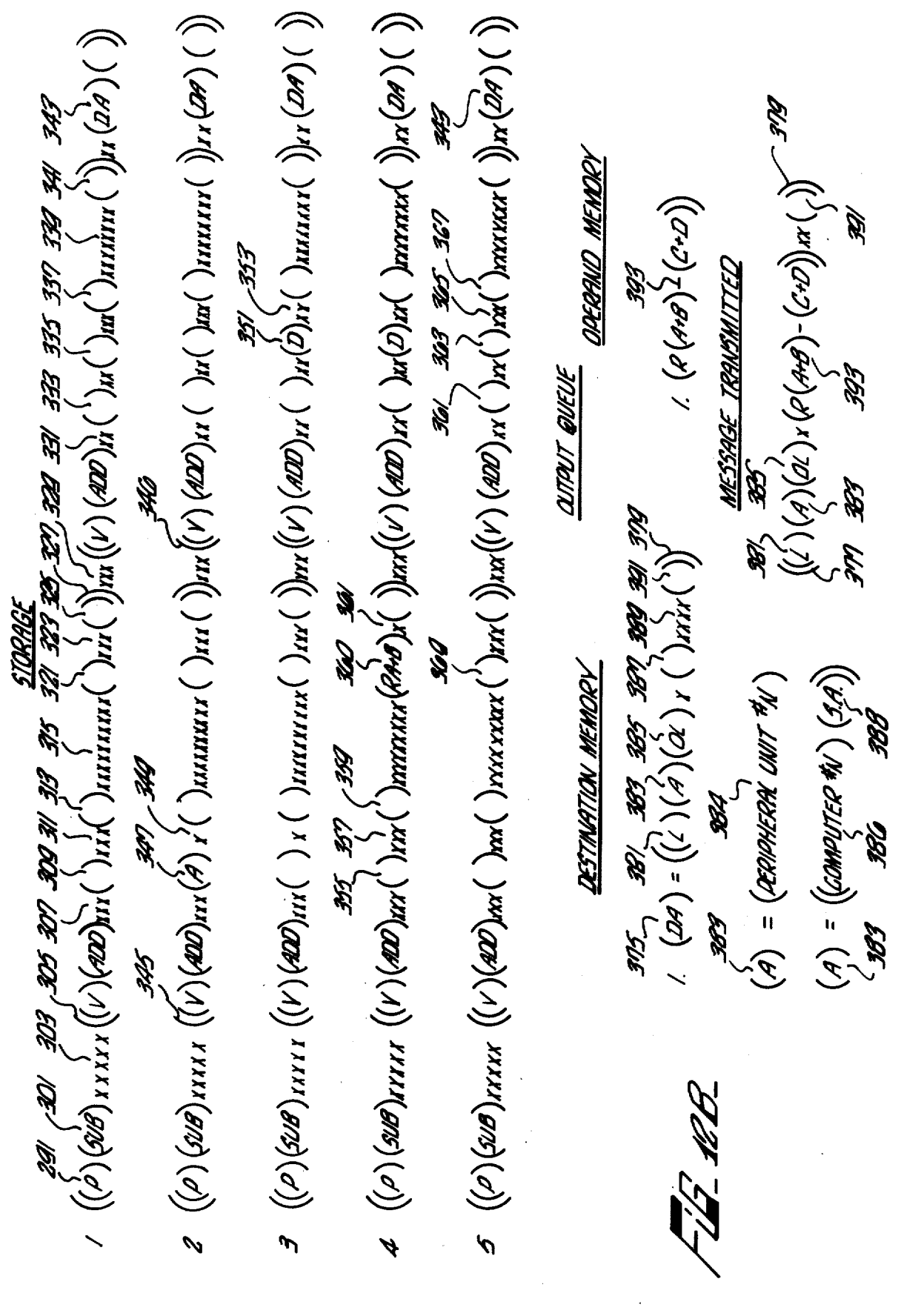

In order to perform the function flow of FIG. 11, the storage of the computer will contain a program file as illustrated in FIG. 12B, under the "storage" heading. The initial contents of this file, prior to the computer receiving any operand files, is illustrated at position "1." The first field 291 of this file is a description field, that identifies the file as a program file. The first field, 301, following this description field is a field describing the operation to be performed. For our example, it is a subtract operation. The next field to follow the operator field 301 is an operand field delimited by a left paren 305 and a right paren 327. This operand field is a vector file that represents a dyadic operation. Following this operand field is a second operand field that is also a vector file. The field immediately preceding the terminating field is a destination address field 343. It should be remembered that space may be provided between the various fields of the subtract program file so that spaces 303, 329, etc., provide for the expansion of the operand fields.

Consider now the first operand field, which is a vector file. In this particular instance, an addition operation is defined. The operand fields 309 and 313 of this particular file, since it defines a dyadic operation, follow the field describing the operator. In addition, this vector file contains a result field 321 instead of a destination address field. The operand fields 309, 313 and result field 321 are all in a contracted state, leaving a considerable amount of empty space 307, 311, 315 and 323 between them. In other words, the fields are simply defined by a left paren followed by a right paren with no characters in between. These operand fields remain contracted, as will be more fully described hereinafter, until operands are stored therein.

The second operand field for the subtract program file is also a vector file structured in the same manner as decribed for the first operand field. There are a pair of operand fields 333 and 335, a result field 337 and a terminating field 341. When these fields are empty, they are in a contracted state leaving a considerable amount of empty space 331, 339, etc., between them.

The above describes the contemplated structure of a program file within the computer storage which remains static in storage until an operand data structure or file arrives at the input queue addressing this particular program file. The structure of this program file provides a recursive mechanism that speeds algorithm execution.

An alternate data structure for performing the function flow of FIG. 11 would be one that utilizes three program files, instead of one program file, containing two vector files, as illustrated. Thus the two add vector files and the subtract program file represent three independent program files. The resultant (R) field of each vector file would be replaced with a destination address (DA) field. The destination address field in both add program files would address the subtract program file, in a manner to be disclosed hereinafter. Utilizing this type of data structure requires that the result of each operation be routed out of the computer and back to its input to get the next operator node. In contrast, the illustrated program file structure eliminates the necessity of sending the result of a vector file operation out of the processor and back to its input for further processing.

To continue with the illustrated data structure, consider now the data files arriving at the input queue. Assume that the first operand to arrive in a data file is the operand A. The file that contains this operand is illustrated in FIG. 12A as file structure 1 under the "input queue" heading. The first field of this data file is a description field 375 that indicates that this particular file is an operand field containing a literal. This description field is analyzed by the field analyzer 146 (FIG. 4) of the control 23, which in response thereto sets up the appropriate paths to computer storage 25 for the next field 377 which is a storage address field addressing the particular vector file to which the literal A belongs. The storage address 377 will address the location in computer storage that starts with the left paren 305 of the add vector file within the subtract program file 301. The next field following the address field 377 is an operand location field 379 that indicates whether the operand field 383 that follows belongs in the left or right operand field 309 or 313, respectively, of that particular vector file. The operand file being received at the input queue also has a terminating field 387 and may have empty space 381, 385 between the fields of that file.

The control 23 by way of its field analyzer ROM 146 and its subroutine library consisting of the plurality of ROMs 154, 156, 158 interrogates the add vector file, after it has been addressed by the operand file at the input queue, to determine if the B operand has previously arrived and is stored within its field 313. Since, in this case, it has not, as is indicated to the control by the empty operand fields 309, 313, the control stores the operand A in the appropriate field 309. As the operand A is written into memory, character by character, the operand file 309 is expanded to accommodate its exact size. The specifics of how the operand is actually written into memory are seen as well within the purview of a person of ordinary skill in the art, and will not be discussed herein.

As a result, therefor, of the literal file illustrated at position 1, arriving at the input queue, the subtract program file in computer storage will have the literal A stored within the appropriate operand field 347 of the vector file which was addressed and begins with the left paren 345, as shown at position 2 under the "storage" heading of FIG. 12B. Since the literal A is now stored within its appropriate operand field, that field has been expanded and the empty space 349 between this operand field and its companion operand field may be completely used up or greatly diminished.

Assume now that the next operand file that comes into the input queue 21 of the computer 11 (FIG. 1) contains operand D in its operand field 382, as shown in position 2 under the "input queue" heading. Besides the description field that tells the control unit the fields that are to follow, a storage address field 376 and an operand location field 389 are present in this operand file. The literal file at position 2 of the input queue has a storage address field 376 that addresses the add vector file within the subtract program file at the starting paren 346 (position 2 under "storage" heading). Once this vector file is addressed, the control unit, upon seeing the operator field of the vector file will cause the appropriate addition microprogram in the microprogram library, made up of ROMs 154, 156 and 158 (FIG. 4) to be activated. If this microprogram detects that all the operands that are necessary to perform the operation are not present, either in the input queue or the storage of the computer, another microprogram is activated for storing the literal D in operand field 382 of the input queue file in the appropriate operand field 351 of the add vector file, as determined by the operand location code in field 389 of the literal file at the input queue. As a result of the second literal file having been processed, the data structure in storage will appear as illustrated at position 3 under the "storage" heading. That is, a literal A is stored in its appropriate operand field in the first add vector file and a literal D is stored in its appropriate operand field in the second add vector file.

Assume now that the third operand file to come into the input queue carries a B operand in the operand field 384 that is to be combined with the A operand. The controller recognizes, because of the description field L, that this is a literal file and, therefore, the following field 378 is a storage address that addresses the first vector file containing the A operand. The controller proceeds to read this addressed vector file; and its field analyzer ROM 146 (FIG. 4) determines from the description field "V" that it is a vector file containing a program. The field that must follow this description field is then an operator code field. In response to the operator field, the field analyzer actuates the appropriate microprogram from the microprogram library ROMs 154, 156 or 158 (FIG. 4) and additionally causes the reading out from storage of the literal A to address the appropriate ROM 125 in the vector logic unit (FIG. 3), while at the same time reading out the literal B from the input queue to address the same ROM 125 in the vector logic unit.

It should be recalled that the vector logic unit is a serial arithmetic unit that operates on two characters at a time, one character from each of the two operand fields. When the vector logic unit has completed its function of adding operand A and B together, the microprogram determines if the resultant field in the second vector file is full. Since in this instance it is empty, it will store the result of the addition of literals A and B in the appropriate resultant field in the first vector file. As a result of the third operand file appearing in the input queue, the subtract program file in storage will be structured as shown at position 4 under the "storage" heading, that is, the operand fields that literals A and B occupied, fields 355 and 359, respectively, are now empty, since they were contracted as read; and the resultant field 359, containing the result of the summation of A and B, is full. The literal D as an operand of the second vector file is also present.

The only missing operand, at this time, is the C literal. Assume now that an operand file comes along containing the C operand in field 386. The control recognizes that this is a literal file and closes the appropriate paths so that the storage address field 380 may address the second vector file. The control will then read this vector file, set up the vector logic unit to perform the operation required by the operator code field therein and proceed to sum C and D in the same manner as described for operands A and B. Upon completion of this operation however, since the resultant field 369 of the first add program subfile is full, besides storing the result of the summation of literals C and D in the resultant field 367, another microprogram is chosen which conditions the vector logic unit according to the subtract operator code field in the subtract program file. This microprogram causes the control unit to supply to the vector logic unit, in character-serial manner, the resultant of the A plus B summation from the resultant field 369 in the computer storage, as the result of C plus D is supplied thereto, to have the two results subtracted.

While this operation is being performed, the destination field 343 of the subtract program file is supplied to the destination address memory 157 of the output queue 29 (FIG. 5). This destination address field 375, as shown in FIG. 12B under the "output queue" heading in position 1, is a destination vector file that has as its first field a description field 381, which, in our example, identifies the file as a literal or operand file; an address field 383 following it; and an operand location field 385 following the address field. Operand fields, such as field 387, may follow the operand location field. Since the syntax of a file structure must be followed, the destination address file terminates with a terminating field 391. The destination address field, since it is a vector file, may also have empty space between the fields within it, such as empty space 389, for example. The operand field 387, at this point, has nothing stored within it and is in contracted form. When the vector logic unit obtains the result of subtracting the literals C+D from the literals A+B, that result as shown in position 1 under the "operand memory" heading of FIG. 12B is sent to the operand memory 155 of the output queue (FIG. 5).

The output control 159 of the output queue 29 (FIG. 5) transmits a message in a form that is essentially identical to the form that is received at the input queue as shown in FIG. 12B under the "message transmitted" heading. Since, in our example, the result is a literal, the transmitted file is an operand file, delimited by a right paren 377 and a left paren 379. The first field is a description field 381 defining the file as an operand file. The second field is an address field 383. This address field, as shown in FIG. 12B, may be a simple field containing a peripheral unit designation 384, or, in case of a multi-processor system, it may contain compound fields such as a field 386 defining a processor unit and a storage address field 388, defining a specific area in the storage of the addressed processor. The field following the address field is an operand location field 385, if needed. The field following the operand location field is the result field 393. The operand file leaving the output queue ends with a terminating field 391 and a right paren 379.

In summary then, the above functional description makes it clear that the computer of FIG. 1 executes an operation only after two data structures are linked, one being a program structure, the other being an operand structure. In the case of the specific example, the program structure in the form of program files are stored in computer storage awaiting the arrival of the operand structures or operand files that address the appropriate program files, causing the control unit of the computer to execute the designated program. This data driven operation, therefore, provides a digital processor that has superior emulation capabilities, and may be used as a basic building block in a multi-processor computer, each of the building blocks having their functions defined by the program files stored within their respective storage areas. Since the arrival of operand files at the input of a specific processor causes the activation of the addressed program when such a computer is utilized as a building block in a multi-processor computer, a master control program or extensive interrupt system which would regulate the interaction of the processors within the multi-processor computer is not required.

It should be understood, of course, the foregoing disclosure relates only to a preferred embodiment of the invention and that numerous modifications may be made therein without departing from the spirit and scope of the invention as set forth in the appended claims.

What is claimed is:

1. A data driven processor providing program files for performing designated data processing operations on a plurality of operands applied thereto, wherein input data containing an operand on which an operation is to be performed is applied as an input operand file having the format $((A_1) (B_1) (C_1) \ldots (N_1) (E_1))$ wherein the left parens are data start characters, the right parens are data end characters, $E_1$ is a terminating code indicating the end of the file, and $A_1, B_1, C_1 \ldots N_1$ are a plurality of fields contained within the file, one of said fields being a description field that identifies the file as an operand file, another of said fields containing an operand on which an operation is to be performed, and another of said fields containing a program file address corresponding to one of said program files, and wherein said processor operates in a manner such that the order and time of performance of said designated data processing operations are determined by the order and time of arrival of said operands, said processor comprising:

storage means for storing program information as a plurality of program files at selectably addressable locations thereof such that the contents of each program file are accessible in response to the program file address contained in an arriving operand file, wherein at least one program file is a recursive program file having the format $((A_2) (B_2) (C_2) \ldots (N_2))$, wherein the left parens are data start characters, the right parens are data end characters, and $A_2, B_2, C_2 \ldots N_2$ are a plurality of fields contained within the file, one of said fields being a destination field, another of said fields being a dominant operation code field indicating a dominant data processing operation, at least another of said fields containing a subordinate file having a like format as a program file and including a subordinate operation code field indicating a subordinate data processing operation, wherein the performance of said dominant operation requires the results of the performance of said subordinate operation, and wherein each subordinate file provides at least one operand storage field for storing the one or more operands on which its subordinate operation is to be performed as well as providing a result storage field for storing the result obtained from performance of the subordinate operation;

logic means responsive to an operation code field accessed from a program file for performing the data processing operation indicated thereby on one or more operands applied thereto; and control means including means responsive to an arriving operand accompanied by a program file address corresponding to a subordinate file in said recursive program file for determining from the contents of the operand storage field of its corresponding subordinate program file whether the arriving operand is the last of the one or more operands required for performance of the corresponding subordinate operation;

said control means also including means responsive to a determination that an arriving operand is not the last required for its corresponding subordinate operation for causing the arriving operand to be stored in an operand storage field of the corresponding subordinate file;

said control means additionally including means responsive to a determination that an arriving operand is the last required for its corresponding subordinate operation for causing the arriving operand and any operands stored in one or more operand storage fields of the corresponding subordinate file to be applied to said logic means along with control signals generated in response to the subordinate operation code field of the corresponding subordinate file so as to cause said logic means to perform the designated subordinate operation on the applied operands and to produce a subordinate result which is stored in the result storage field of the corresponding subordinate file in the event that any other subordinate result required by the corresponding dominant operation is not yet available;

said control means further including means responsive to the generation by said logic means of a subordinate result for determining from the result storage field in each corresponding subordinate file contained in the corresponding recursive program file whether all of the subordinate results required for the corresponding dominant operation have been produced and, if so, for causing these subordinate results to be applied to said logic means along with control signals derived from said dominant operation code field so as to cause said logic means to perform the designated dominant operation and to produce a dominant result representative thereof.

2. The invention in accordance with claim 1, wherein data is applied to said processor in a format employing four unique characters each of which is represented by a unique pair of binary bits and includes a "1" character and a "0" character in addition to said data start and data end characters.

3. The invention in accordance with claim 2, wherein said logic means and said control means recognize the end of an operand file in response to the detection of the terminating code thereof and recognize the start and end of a field in response to detection of the left and right parens provided at the beginning and end thereof.

4. The invention in accordance with claim 1, wherein said processor includes output means operating in conjunction with said control means for providing an output operand file having the same format as an input operand file and containing a resultant operand produced by said logic means in response to a dominant operation, said output operand including a destination address derived from the destination field of the program file whose dominant operation code field was used to produce said resultant operand.

5. In a data processing system including at least one processor, a method of driving said processor such that the order and time of performance of data processing operations are determined by the order and time of arrival of the operands to be processed, said method comprising:

applying input data containing an operand on which an operation is to be performed to said processor as an operand file having the format $((A_1) (B_1) (C_1) \ldots (N_1) (E_1))$ wherein the left parens are data start characters, the right parens are data end characters, $E_1$ is a terminating code indicating the end of the file, and $A_1, B_1, C_1, \ldots N_1$ are a plurality of fields contained within the file, one of said fields being a description field that identifies the file as an operand file, another of said fields containing an operand on which an operation is to be performed, and another of said fields containing a program file address;

storing program information in said processor as a plurality of selectably addressable program files, at least one of said program files being a recursive program file having the format $((A_2) (B_2) (C_2) \ldots (N_2))$, wherein the left parens are data start characters, the right parens are data end characters, and $A_2, B_2, C_2 \ldots N_2$ are a plurality of fields contained within the file, one of said fields being a destination field, another of said fields being a dominant operation code field indicating a dominant data processing operation, at least another of said fields containing a subordinate file having a like format as a program file and including a subordinate operation code field indicating a subordinate data processing operation, and wherein the performance of said dominant operation requires the results of the performance of said subordinate operation;

determining in response to an arriving input operand file containing a program file address corresponding to a subordinate file in said recursive program file whether it is the last of the one or more operands required for performance of the corresponding subordinate operation;

storing the arriving operand in response to a determination that it is not the last of the operands required for performance of the corresponding subordinate operation;

performing the corresponding subordinate operation in response to determining that the arriving operand is the last of the one or more operands required for performance thereof;

generating a subordinate result in response to the performance of a subordinate operation;

performing the dominant operation of said program file in response to determining that all of the required subordinate results have been generated; and generating a dominant result in response to the performance of said dominant operation.

6. The method in accordance with claim 5, wherein said method includes outputting an output operand file from said processor having the same format as an input operand file and containing a dominant result operand produced by said logic means along with a destination address field derived from said destination field of said recursive program file.

7. The invention in accordance with claim 5, wherein one or more of the fields of each subordinate file provides for operand storage of the one or more operands required for performance of the corresponding subordinate operation, and wherein the step of determining includes accessing the operand storage of the subordinate file corresponding to the program file address of an input operand file to determine the presence of the operands required for performance of the corresponding subordinate operation.

8. The invention in accordance with claim 7, wherein one of the fields of each subordinate file also provides for storage of a subordinate result produced by the corresponding subordinate operation, wherein the step of generating includes storing a generated subordinate result in the result storing portion of the corresponding subordinate file in the event that all other subordinate results required by the corresponding dominant operation are not yet available, and wherein the step of performing said dominant operation includes accessing of each stored subordinate result to determine whether all of the subordinate results required for said dominant operation have been generated.

* * * * *

UNITED STATES PATENT AND TRADEMARK OFFICE
CERTIFICATE OF CORRECTION

PATENT NO. : 4,156,910
DATED : May 29, 1979
INVENTOR(S) : Robert S. Barton, et al.

It is certified that error appears in the above–identified patent and that said Letters Patent are hereby corrected as shown below:

```
Col.  2, line 46, change "process" to --processor--.
Col.  6, line 19, change "had" to --has--.
Col.  9, line 36, change "circit" to --circuit--.
Col. 11, line 35, change "is" to --as--;
         line 64, change "of", first occurrence, to --or--.
Col. 12, line 34, after "operator" insert --node--.
Col. 13, line 35, change "parents" to --parens--.
Col. 14, line 28, change "decribed" to --described--;
         line 52, after "get" insert --to--.
```

Signed and Sealed this

Twenty-eighth Day of August 1979

[SEAL]

Attest:

LUTRELLE F. PARKER

*Attesting Officer*   *Acting Commissioner of Patents and Trademarks*